United States Patent
Pan (10) Patent No.: US 12,452,861 B2
(45) Date of Patent: Oct. 21, 2025

(54) POSITIONING METHOD AND APPARATUS, WLAN DEVICE, AND STORAGE MEDIUM

(71) Applicant: Huawei Technologies Co., Ltd., Shenzhen (CN)

(72) Inventor: Chun Pan, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 410 days.

(21) Appl. No.: 17/870,430

(22) Filed: Jul. 21, 2022

(65) Prior Publication Data

US 2022/0361207 A1    Nov. 10, 2022

Related U.S. Application Data

(63) Continuation of application No. PCT/CN2020/115683, filed on Sep. 16, 2020.

(30) Foreign Application Priority Data

Feb. 10, 2020   (CN) .......................... 202010085284.4

(51) Int. Cl.
*H04W 72/1268*    (2023.01)
*H04W 24/10*      (2009.01)
(Continued)

(52) U.S. Cl.
CPC ....... *H04W 72/1268* (2013.01); *H04W 24/10* (2013.01); *H04W 64/003* (2013.01); *H04W 84/12* (2013.01)

(58) Field of Classification Search
CPC ............. H04W 72/1268; H04W 24/10; H04W 64/003; H04W 84/12
See application file for complete search history.

(56) References Cited

U.S. PATENT DOCUMENTS

| | | | |
|---|---|---|---|
| 10,264,544 B1 | 4/2019 | Chu et al. | |
| 2007/0183383 A1* | 8/2007 | Bitran | H04W 88/06 370/338 |

(Continued)

FOREIGN PATENT DOCUMENTS

| | | |
|---|---|---|
| CN | 106063305 A | 10/2016 |
| CN | 106535334 A | 3/2017 |

(Continued)

OTHER PUBLICATIONS

Vladica Sark et al.,"Efficient Positioning Method Applicable in Dense Multi User Scenarios," IEEE 802.11-16/1249r1, Sep. 13, 2016, 14 pages.

(Continued)

*Primary Examiner* — Chandrahas B Patel
(74) *Attorney, Agent, or Firm* — Conley Rose, P.C.

(57) ABSTRACT

A positioning method and a WLAN device in the field of positioning technologies includes obtaining by the WLAN device an uplink scheduling parameter sent by another WLAN device to a plurality of to-be-positioned WLAN devices, where the uplink scheduling parameter indicates radio resources allocated to the plurality of to-be-positioned WLAN devices; receiving uplink signals by the WLAN device; and measuring respective positioning data of the plurality of to-be-positioned WLAN devices by the WLAN device based on the radio resources of the plurality of to-be-positioned WLAN devices and the received uplink signals.

20 Claims, 6 Drawing Sheets

(51) Int. Cl.
*H04W 64/00* (2009.01)
*H04W 84/12* (2009.01)

(56) References Cited

U.S. PATENT DOCUMENTS

| | | | |
|---|---|---|---|
| 2015/0215793 A1* | 7/2015 | Siomina | H04W 64/00 |
| | | | 455/456.1 |
| 2015/0245335 A1 | 8/2015 | Zhou et al. | |
| 2015/0296359 A1* | 10/2015 | Edge | G01S 1/0428 |
| | | | 455/404.2 |
| 2016/0359653 A1 | 12/2016 | Lee et al. | |
| 2017/0289933 A1 | 10/2017 | Segev et al. | |
| 2017/0295004 A1 | 10/2017 | Amizur et al. | |
| 2017/0353867 A1* | 12/2017 | Baboescu | H04L 27/2614 |
| 2018/0027561 A1 | 1/2018 | Segev et al. | |
| 2018/0249437 A1 | 8/2018 | Lindskog et al. | |
| 2018/0310133 A1 | 10/2018 | Ramasamy et al. | |
| 2019/0324111 A1* | 10/2019 | Marshall | G01S 5/0236 |
| 2021/0075566 A1 | 3/2021 | Guo | |
| 2021/0136599 A1 | 5/2021 | Yang et al. | |

FOREIGN PATENT DOCUMENTS

| | | |
|---|---|---|
| CN | 107735993 A | 2/2018 |
| CN | 109479282 A | 3/2019 |
| CN | 110536469 A | 12/2019 |
| CN | 110719599 A | 1/2020 |
| EP | 3314971 B1 | 8/2019 |
| EP | 3443376 B1 | 9/2020 |
| WO | 2018048809 A1 | 3/2018 |
| WO | 2018156229 A1 | 8/2018 |
| WO | 2018169799 A1 | 9/2018 |

OTHER PUBLICATIONS

Vladica Sark et al., "Efficient Positioning Method using Beacon Frames," IEEE 802.11-17/0981r0, Jul. 12, 2017, 12 pages.

Samsung, "Informative text for passive location ranging," IEEE 802.11-19/0035r12, IEEE P802.11 Wireless LANs, Nov. 14, 2019, 15 pages.

* cited by examiner

POSITIONING METHOD AND APPARATUS, WLAN DEVICE, AND STORAGE MEDIUM

CROSS-REFERENCE TO RELATED APPLICATIONS

This application is a continuation application of International Patent Application No. PCT/CN2020/115683, filed on Sep. 16, 2020, which claims priority to Chinese Patent Application No. 202010085284.4, filed on Feb. 10, 2020. The disclosures of the aforementioned applications are hereby incorporated by reference in their entireties.

TECHNICAL FIELD

This application relates to the field of positioning technologies, and in particular, to a positioning method and apparatus, a WLAN device, and a storage medium.

BACKGROUND

When a plurality of to-be-positioned wireless local area network (WLAN) devices are positioned by using a plurality of WLAN devices, each WLAN device sequentially sends a trigger frame to the plurality of to-be-positioned WLAN devices, so that the plurality of to-be-positioned WLAN devices sequentially send uplink signals to the plurality of WLAN devices. After each WLAN device receives the uplink signals sent by the plurality of to-be-positioned WLAN devices, the WLAN device positions the plurality of to-be-positioned WLAN devices based on the received uplink signals.

However, in this positioning manner, only after radio resources are allocated to the to-be-positioned WLAN devices, the WLAN device can position the to-be-positioned WLAN devices based on the radio resources allocated to the to-be-positioned WLAN devices, causing poor positioning timeliness of the to-be-positioned WLAN devices.

SUMMARY

This application provides a positioning method and apparatus, a WLAN device, and a storage medium, to resolve a problem of relatively poor positioning timeliness of to-be-positioned WLAN devices in a related technology. Technical solutions provided in this application are as follows.

According to a first aspect, this application provides a positioning method. The method includes a WLAN device obtains an uplink scheduling parameter sent by another WLAN device to a plurality of to-be-positioned WLAN devices, where the uplink scheduling parameter is used to indicate radio resources allocated to the plurality of to-be-positioned WLAN devices; the WLAN device receives uplink signals; and the WLAN device measures respective positioning data of the plurality of to-be-positioned WLAN devices based on the radio resources of the plurality of to-be-positioned WLAN devices and the received uplink signals.

In the positioning method provided in this application, the WLAN device obtains the uplink scheduling parameter sent by the other WLAN device to the plurality of to-be-positioned WLAN devices, so that the WLAN device does not need to send, to the to-be-positioned WLAN devices, an uplink scheduling signal that carries the uplink scheduling parameter. In this way, the WLAN device can measure the positioning data of the to-be-positioned WLAN devices based on the uplink scheduling parameter after obtaining the uplink scheduling parameter, and therefore does not need to measure the positioning data of the to-be-positioned WLAN devices only after the WLAN device sends the uplink scheduling signal to the to-be-positioned WLAN devices, thereby effectively improving positioning timeliness of the to-be-positioned WLAN devices.

In addition, because a total quantity of uplink scheduling signals that need to be sent when uplink scheduling is performed on the to-be-positioned WLAN devices is reduced, air interface overheads are effectively reduced.

In an implementable manner, an implementation process in which the WLAN device obtains the uplink scheduling parameter sent by the other WLAN device to the plurality of to-be-positioned WLAN devices includes the WLAN device listens to a trigger frame sent by the other WLAN device to the plurality of to-be-positioned WLAN devices; and the WLAN device extracts the uplink scheduling parameter from the trigger frame.

In this case, the WLAN device may include a listening receiver, and an operating channel of the listening receiver is the same as an operating channel of the other WLAN device. Therefore, the WLAN device can listen, by using the listening receiver, to the trigger frame sent by the other WLAN device to the plurality of to-be-positioned WLAN devices.

In another implementable manner, when both the WLAN device and the other WLAN device include radio frequency circuits and baseband circuits, and a baseband circuit of the WLAN device is connected to a baseband circuit of the other WLAN device in a wired manner, after the baseband circuit of the other WLAN device sends, to a radio frequency circuit of the other WLAN device, a signal that carries the uplink scheduling parameter, the radio frequency circuit of the other WLAN device may send, to the plurality of to-be-positioned WLAN devices, the signal that carries the uplink scheduling parameter, to perform uplink scheduling on the plurality of to-be-positioned WLAN devices. In addition, after sending the uplink scheduling parameter to the radio frequency circuit of the other WLAN device, the baseband circuit of the other WLAN device may further send, to the baseband circuit of the WLAN device by using the wired connection to the baseband circuit of the WLAN device, the signal that carries the uplink scheduling parameter, so that the WLAN device obtains the uplink scheduling parameter. In this case, an implementation process in which the WLAN device obtains the uplink scheduling parameter sent by the other WLAN device to the plurality of to-be-positioned WLAN devices includes the baseband circuit of the WLAN device receives the uplink scheduling parameter sent by the baseband circuit of the other WLAN device.

According to a second aspect, this application provides a positioning apparatus. The positioning apparatus includes an obtaining module, configured to obtain an uplink scheduling parameter sent by other WLAN device to a plurality of to-be-positioned WLAN devices, where the uplink scheduling parameter is used to indicate radio resources allocated to the plurality of to-be-positioned WLAN devices; a receiving module, configured to receive uplink signals; and a processing module, configured to measure respective positioning data of the plurality of to-be-positioned WLAN devices based on the radio resources of the plurality of to-be-positioned WLAN devices and the received uplink signals.

Optionally, the obtaining module is configured to listen to a trigger frame sent by the other WLAN device; and extract the uplink scheduling parameter from the trigger frame.

Optionally, the positioning apparatus includes a listening receiver, and an operating channel of the listening receiver is the same as an operating channel of the other WLAN device.

Optionally, when both the positioning apparatus and the other WLAN device include baseband circuits, and a baseband circuit of the positioning apparatus is connected to a baseband circuit of the other WLAN device in a wired manner, the obtaining module is configured to receive, by using the baseband circuit of the positioning apparatus, the uplink scheduling parameter sent by the baseband circuit of the other WLAN device.

According to a third aspect, this application provides a wireless local area network WLAN device, including a processor and a receiver. The processor is configured to obtain an uplink scheduling parameter sent by another WLAN device to a plurality of to-be-positioned WLAN devices, where the uplink scheduling parameter is used to indicate radio resources allocated to the plurality of to-be-positioned WLAN devices. The receiver is configured to receive uplink signals, and transmit the received uplink signals to the processor. The processor is configured to measure respective positioning data of the plurality of to-be-positioned WLAN devices based on the radio resources of the plurality of to-be-positioned WLAN devices and the received uplink signals.

Optionally, the receiver is further configured to listen to a trigger frame sent by the other WLAN device, extract the uplink scheduling parameter from the trigger frame, and transmit the uplink scheduling parameter to the processor.

Correspondingly, when being configured to obtain the uplink scheduling parameter sent by the other WLAN device to the plurality of to-be-positioned WLAN devices, the processor is configured to receive the uplink scheduling parameter transmitted by the receiver.

Optionally, the receiver includes a listening receiver, and an operating channel of the listening receiver is the same as an operating channel of the other WLAN device.

Optionally, both the WLAN device and the other WLAN device include baseband circuits, and a baseband circuit of the WLAN device is connected to a baseband circuit of the other WLAN device in a wired manner. The baseband circuit of the WLAN device is configured to receive the uplink scheduling parameter transmitted by the baseband circuit of the other WLAN device, and transmit the uplink scheduling parameter to the processor.

Correspondingly, when being configured to obtain the uplink scheduling parameter sent by the other WLAN device to the plurality of to-be-positioned WLAN devices, the processor is configured to receive the uplink scheduling parameter transmitted by the baseband circuit of the WLAN device.

According to a fourth aspect, this application provides a storage medium. When instructions in the storage medium are executed by a processor, the positioning method provided in the first aspect is implemented.

According to a fifth aspect, this application provides a computer program product. When the computer program product runs on a computing device, the computing device is enabled to perform the positioning method provided in the first aspect.

DESCRIPTION OF EMBODIMENTS

To make the objectives, technical solutions, and advantages of this application clearer, the following further describes implementations of this application in detail with reference to the accompanying drawings.

Figure 1:
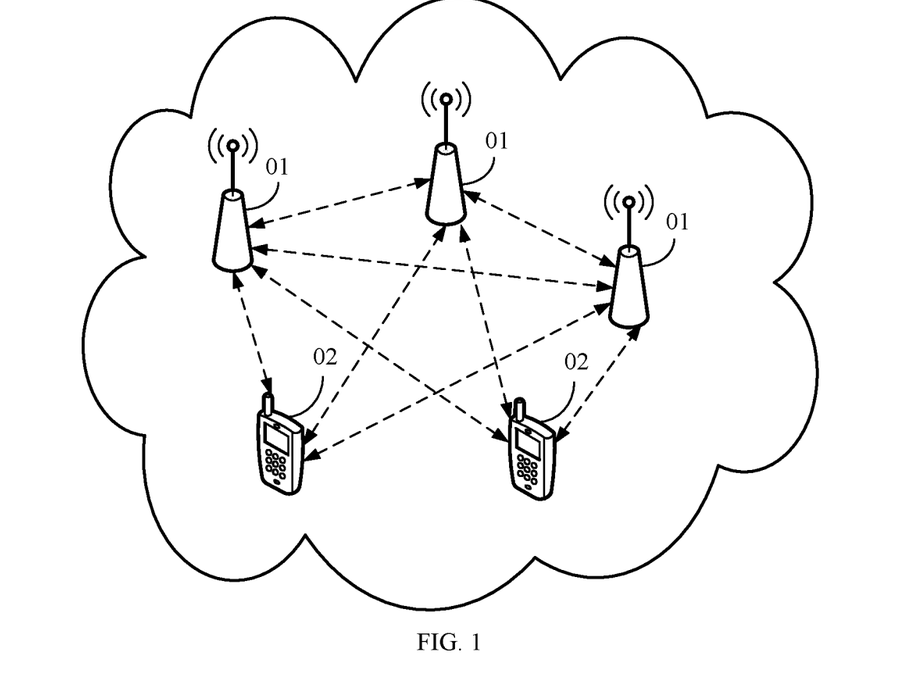
FIG. 1 is a schematic diagram of an implementation environment to which a positioning method relates according to an embodiment of this application.

FIG. 1 is a schematic diagram of an implementation environment to which a positioning method relates according to an embodiment of this application. As shown in FIG. 1, the implementation environment may include a plurality of WLAN devices 01 and a plurality of to-be-positioned WLAN devices 02. At least one of the plurality of WLAN devices 01 may perform uplink scheduling on the to-be-positioned WLAN devices 02. In addition, an uplink scheduling parameter for performing uplink scheduling on the to-be-positioned WLAN devices 02 may be shared between the plurality of WLAN devices 01. Each to-be-positioned WLAN device 02 may send an uplink signal to the WLAN devices 01 based on the uplink scheduling parameter. The plurality of WLAN devices 01 may receive the uplink signal sent by each to-be-positioned WLAN device 02, and decode the received uplink signal based on the uplink scheduling parameter, to measure positioning data of each to-be-positioned WLAN device 02 based on a decoded uplink signal.

The positioning data of the to-be-positioned WLAN device 02 may be location data (for example, a coordinate value) of the to-be-positioned WLAN device, or may be intermediate data that can be used to calculate the location data of the to-be-positioned WLAN device. For example, a WLAN device 01 may obtain a distance between the to-be-positioned WLAN device 02 and the WLAN device 01 through measurement. The distance cannot directly indicate a location of the to-be-positioned WLAN device 02, but can be combined with a distance obtained by another WLAN device through measurement to obtain the location data of the to-be-positioned WLAN device 02 (for example, by using a three-point positioning method). Therefore, the distance between the to-be-positioned WLAN device 02 and the WLAN device 01 belongs to the positioning data.

In addition, positioning the to-be-positioned WLAN device 02 may include performing angle estimation on the to-be-positioned WLAN device 02, measuring a distance from the to-be-positioned WLAN device 02 to the WLAN device 01 (also referred to as performing distance measurement on the to-be-positioned WLAN device 02), or performing distance measurement and angle estimation on the to-be-positioned WLAN device.

The WLAN device 01 may be a wireless access point (WAP) or a part of the wireless access point. The WAP may be a station device, a network device, or the like with a WLAN chip. The to-be-positioned WLAN device 02 may be a station (STA). For example, the STA may be a mobile phone, a tablet computer, a set top box, a smart TV, an intelligent wearable device, a wireless access point, an in-vehicle communications device, or a computer.

In this embodiment of this application, after at least one of the plurality of WLAN devices 01 sends the uplink scheduling parameter to the to-be-positioned WLAN devices 02, another of the plurality of WLAN devices 01 may obtain the uplink scheduling parameter, so that not all WLAN devices 01 need to send, to the to-be-positioned WLAN devices 02, uplink scheduling signals that carry the uplink scheduling parameter. The other WLAN device 01 may be any one of the plurality of WLAN devices 01 other than the at least one WLAN device 01. In this way, each WLAN device 01 can position the to-be-positioned WLAN devices 02 based on the uplink scheduling parameter after obtaining the uplink scheduling parameter, and therefore does not need to position the to-be-positioned WLAN devices 02 only after the WLAN device 01 sends an uplink scheduling signal to the to-be-positioned WLAN devices 02, thereby effectively improving positioning timeliness of the to-be-positioned WLAN devices. In addition, because a total quantity of uplink scheduling signals that need to be sent when uplink scheduling is performed on the to-be-positioned WLAN devices is reduced, air interface overheads are effectively reduced.

Figure 2:
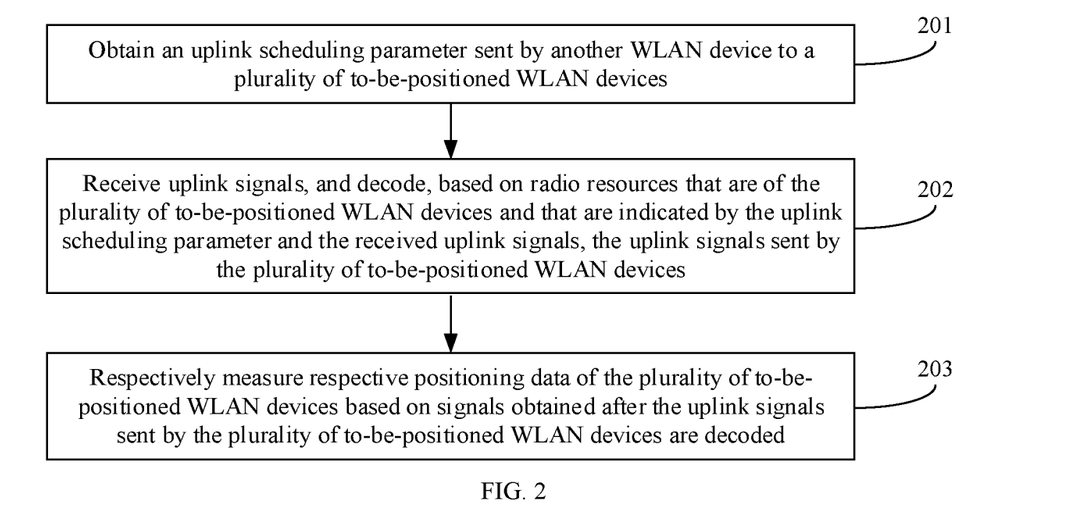
FIG. 2 is a flowchart of a positioning method according to an embodiment of this application.

The following describes an implementation process of positioning methods provided in embodiments of this application. FIG. 2 is a flowchart of a positioning method according to an embodiment of this application. As shown in FIG. 2, the method may include the following steps.

Step 201: A WLAN device obtains an uplink scheduling parameter sent by another WLAN device to a plurality of to-be-positioned WLAN devices.

The WLAN device and the other WLAN device may jointly position the plurality of to-be-positioned WLAN devices. Alternatively, the other WLAN device may perform uplink scheduling on the plurality of to-be-positioned WLAN devices, and the WLAN device may position the plurality of to-be-positioned WLAN devices.

When a WLAN device is associated with a plurality of to-be-positioned WLAN devices, in order that the WLAN device distinguishes between uplink signals sent by the different to-be-positioned WLAN devices and decodes the uplink signals sent by the different to-be-positioned WLAN devices, the WLAN device needs to allocate radio resources to the plurality of to-be-positioned WLAN devices. In addition, the WLAN device may allocate radio resources to some or all of the plurality of to-be-positioned WLAN devices.

Optionally, the WLAN device may send an uplink scheduling parameter to the plurality of to-be-positioned WLAN devices, to allocate the radio resources to the plurality of to-be-positioned WLAN devices. The uplink scheduling parameter is used to indicate the radio resources allocated to the plurality of to-be-positioned WLAN devices. For example, the uplink scheduling parameter may indicate subcarrier resource units (RU) and spatial streams (SS) that are allocated to the plurality of to-be-positioned WLAN devices. In an implementable manner, the WLAN device may send a trigger frame to the plurality of to-be-positioned WLAN devices, where the trigger frame may carry the uplink scheduling parameter.

Figure 3:
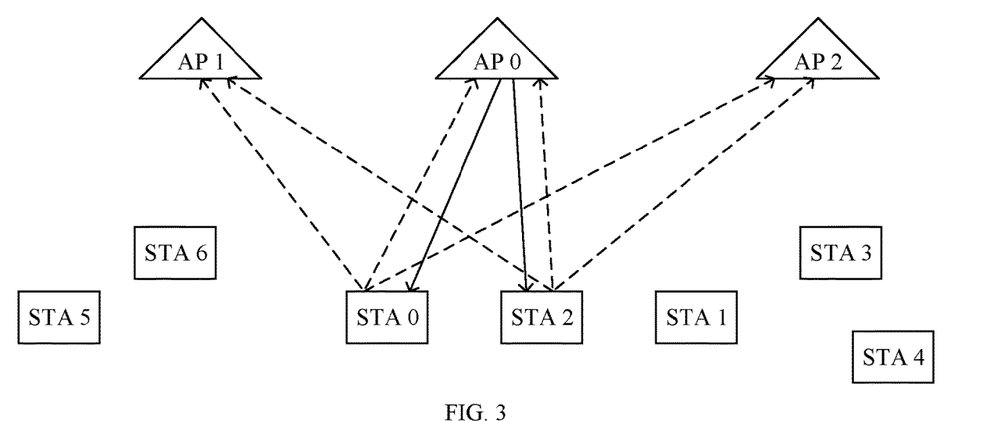
FIG. 3 is a schematic deployment diagram of WLAN devices and to-be-positioned WLAN devices according to an embodiment of this application.
Figure 4:
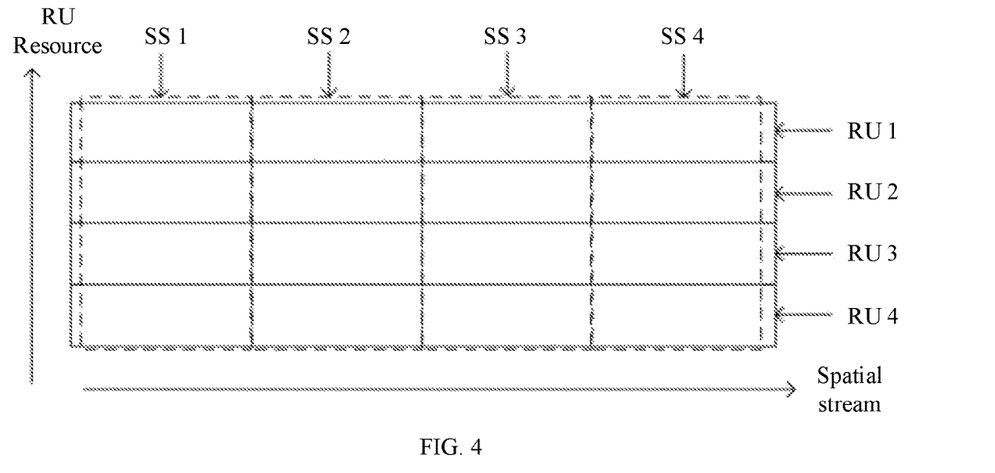
FIG. 4 is a schematic diagram of wireless resource allocation according to an embodiment of this application.

For example, as shown in FIG. 3, an AP 0 is associated with a STA 0, a STA 1, and a STA 2, an AP 1 is associated with a STA 5 and a STA 6, and an AP 2 is associated with a STA 3 and a STA 4. The AP 0 sends, to the STA 0 and the STA 2, a trigger frame that carries an uplink scheduling parameter, and does not send the trigger frame to the STA 1 (as shown by solid arrows in FIG. 3). As shown in FIG. 4, the trigger frame may indicate both the STA 0 and the STA 2 to use all RU resources (including an RU 1 to an RU 4), the STA 0 to use a spatial stream SS 1 and a spatial stream SS 2, and the STA 2 to use a spatial stream SS 3 and a spatial stream SS 4.

Step 201 may be implemented in a plurality of manners. The following describes step 201 by using the following two implementable manners as examples.

Figure 5:
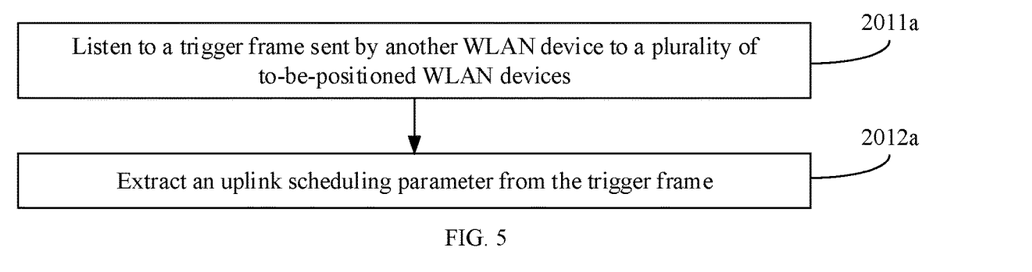
FIG. 5 is a flowchart of a method for obtaining, by a WLAN device, an uplink scheduling parameter according to an embodiment of this application.

In a first implementable manner of step 201, the WLAN device may obtain the uplink scheduling parameter in a wireless listening manner. As shown in FIG. 5, an implementation process of step 201 may include the following steps.

Step 2011*a*: The WLAN device listens to a trigger frame sent by the other WLAN device to the plurality of to-be-positioned WLAN devices.

The WLAN device may detect whether the other WLAN device is sending a trigger frame. When detecting that the other WLAN device is sending a trigger frame, the WLAN device may obtain the trigger frame.

In an implementable manner, a listening receiver may be configured in the WLAN device, and an operating channel of the listening receiver is the same as an operating channel of the other WLAN device. Therefore, the WLAN device can listen, by using the listening receiver, to the trigger frame sent by the other WLAN device. For example, one receiver may be configured in the WLAN device. The receiver may listen to the trigger frame sent by the other WLAN device, and may also receive uplink signals sent by the to-be-positioned WLAN devices. For another example, at least two receivers may be configured in the WLAN device. One receiver is a listening receiver, and the listening receiver may be configured to listen to the trigger frame sent by the other WLAN device. The other receiver is configured to receive uplink signals sent by the to-be-positioned WLAN devices.

In addition, the receiver is a component having at least a signal receiving function. For example, the receiver may be a receiver dedicated to receiving a signal. Alternatively, the receiver may also have a signal sending function. In this case, the receiver is also referred to as a transceiver.

Step 2012*a*: The WLAN device extracts the uplink scheduling parameter from the trigger frame.

A format of the trigger frame is usually pre-agreed on in a communications protocol. Therefore, after the WLAN device obtains, through listening, the trigger frame sent by the other WLAN device to the plurality of to-be-positioned WLAN devices, the WLAN device may extract the uplink scheduling parameter from a specified field of the trigger frame based on the pre-agreed format of the trigger frame.

For example, according to the 802.11.ax protocol, a user field of the trigger frame includes a radio frequency resource unit allocation field and a spatial stream allocation field. The radio frequency resource unit allocation field is used to indicate RU resources that can be used by the to-be-positioned WLAN devices, and the spatial stream allocation field is used to indicate spatial streams that can be used by the to-be-positioned WLAN devices. After the WLAN device obtains, through listening, the trigger frame sent by the other WLAN device to the plurality of to-be-positioned WLAN devices, the WLAN device may extract content carried in the radio frequency resource unit allocation field, to obtain the radio frequency resources allocated to the different to-be-positioned WLAN devices; and extract content carried in the spatial stream allocation field, to obtain the spatial streams allocated to the different to-be-positioned WLAN devices.

In a second implementable manner of step 201, both the WLAN device and the other WLAN device include baseband circuits, and a baseband circuit of the WLAN device is connected to a baseband circuit of the other WLAN device in a wired manner. In this case, the baseband circuit of the WLAN device may obtain, by using the wired connection to the baseband circuit of the other WLAN device, the uplink scheduling parameter sent by the other WLAN device to the plurality of to-be-positioned WLAN devices. An implementation process of step 201 may include the baseband circuit of the WLAN device receives the uplink scheduling parameter sent by the baseband circuit of the other WLAN device by using the wired connection between the two devices.

The WLAN device includes the baseband circuit and a radio frequency circuit. The baseband circuit is configured to perform signal processing on signals received and sent by the WLAN device. The radio frequency circuit is configured to receive and send signals. In this embodiment of this application, the baseband circuits and radio frequency circuits in both the WLAN device and the other WLAN device may be deployed according to a remote radio architecture. That is, the baseband circuit and the radio frequency circuit of the WLAN device may be separately deployed, and the baseband circuit and a radio frequency circuit of the other WLAN device may also be separately deployed. In addition, the baseband circuit of the WLAN device may be connected to the baseband circuit of the other WLAN device in a wired manner. For example, the baseband circuit of the WLAN device may be connected to the baseband circuit of the other WLAN device by using a communications bus, and the communications bus may be an optical fiber, a peripheral component interconnect express (PCIe) bus, or the like. In addition, the baseband circuit of the WLAN device and the baseband circuit of the other WLAN device may be further installed in a same housing. Because a baseband circuit installed in the housing and a radio frequency circuit deployed in a remote manner jointly implement a function of a WLAN device, an overall structure that includes a baseband circuit in the housing and a radio frequency circuit deployed in a remote manner may be referred to as a WLAN device.

In this deployment manner, the baseband circuit of the other WLAN device may send, to the radio frequency circuit of the other WLAN device, a signal that carries the uplink scheduling parameter, and the radio frequency circuit of the other WLAN device may send, to the plurality of to-be-positioned WLAN devices, the signal that carries the uplink scheduling parameter, to perform uplink scheduling on the plurality of to-be-positioned WLAN devices. In addition, after sending the uplink scheduling parameter to the radio frequency circuit of the other WLAN device, the baseband circuit of the other WLAN device may further send, to the baseband circuit of the WLAN device by using the wired connection to the WLAN device, the signal that carries the uplink scheduling parameter, so that the WLAN device obtains the uplink scheduling parameter. Further, after receiving the signal that carries the uplink scheduling parameter, the baseband circuit of the WLAN device may further send, to the radio frequency circuit of the WLAN device, the signal that carries the uplink scheduling parameter, so that the radio frequency circuit of the WLAN device obtains the uplink scheduling parameter.

Figure 6:
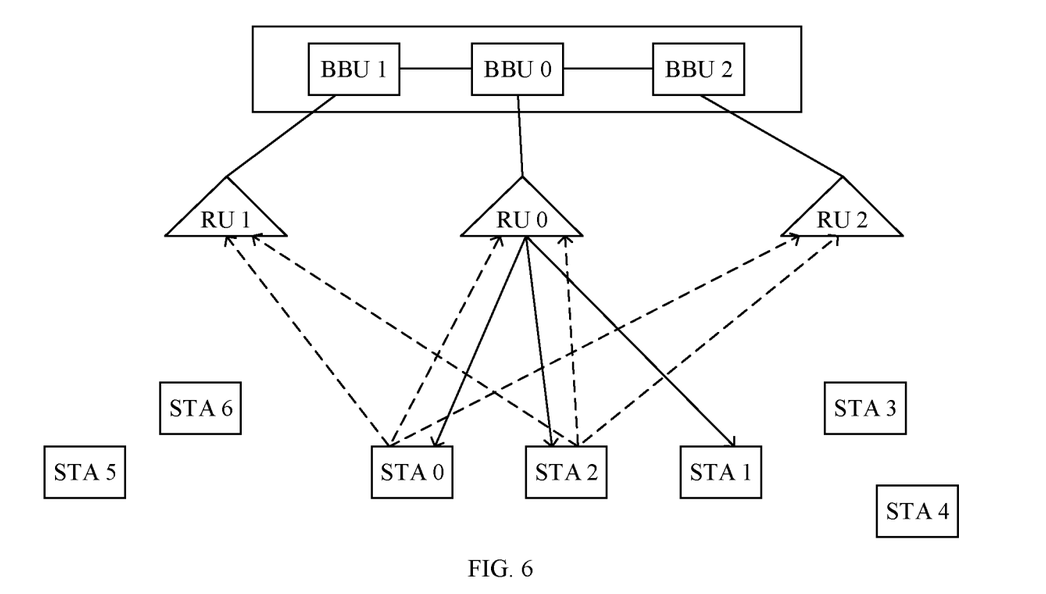
FIG. 6 is another schematic deployment diagram of WLAN devices and to-be-positioned WLAN devices according to an embodiment of this application.

For example, as shown in FIG. 6, an AP 0 includes a baseband circuit BBU 0 and a radio frequency circuit RU 0, an AP 1 includes a baseband circuit BBU 1 and a radio frequency circuit RU 1, and an AP 2 includes a baseband circuit BBU 2 and a radio frequency circuit RU 2. After the baseband circuit BBU 0 of the AP 0 sends, to the radio frequency circuit RU 0 of the AP 0, a signal that carries an uplink scheduling parameter, the radio frequency circuit RU 0 of the AP 0 may send, to a plurality of to-be-positioned WLAN devices, the signal that carries the uplink scheduling parameter. In addition, the baseband circuit BBU 0 of the AP 0 may further send, to the baseband circuit BBU 1 of the AP 1 and the baseband circuit BBU 2 of the AP 2 by using a communications bus, the signal that carries the uplink scheduling parameter. After receiving the signal that carries the uplink scheduling parameter, the baseband circuit BBU 1 of the AP 1 may send, to the radio frequency circuit RU 1 of the AP 1, the signal that carries the uplink scheduling parameter, so that the radio frequency circuit RU 1 obtains the uplink scheduling parameter. In addition, after receiving the signal that carries the uplink scheduling parameter, the baseband circuit BBU 2 of the AP 2 may send, to the radio frequency circuit RU 2 of the AP 2, the signal that carries the uplink scheduling parameter, so that the radio frequency circuit RU 2 obtains the uplink scheduling parameter.

Step 202: The WLAN device receives uplink signals, and decodes, based on radio resources that are of the plurality of to-be-positioned WLAN devices and that are indicated by the uplink scheduling parameter and the received uplink signals, the uplink signals sent by the plurality of to-be-positioned WLAN devices.

When the plurality of to-be-positioned WLAN devices send the uplink signals, because all the uplink signals sent by the to-be-positioned WLAN devices are received by the WLAN device, and the uplink scheduling parameter is used to indicate the radio resources allocated to the plurality of to-be-positioned WLAN devices, the WLAN device may receive the uplink signals sent by the to-be-positioned WLAN devices, and perform channel estimation based on the received uplink signals. In addition, after performing channel estimation based on the uplink signals, the WLAN device may distinguish, based on the radio resources allocated to the plurality of to-be-positioned WLAN devices, between the uplink signals sent by the different to-be-positioned WLAN devices in the uplink signals, and decode the uplink signals sent by the different to-be-positioned WLAN devices, to separately measure respective positioning data of the plurality of to-be-positioned WLAN devices based on decoded uplink signals.

It should be noted that before the received uplink signals are decoded, data preprocessing may be further performed on the received uplink signals by using the receiver. For example, the receiver may perform signal amplification and sampling on the received uplink signals, perform an analog-to-digital conversion operation on sampled uplink signals, perform time-frequency synchronization on uplink signals obtained after the analog-to-digital conversion, identify direct path signals from uplink signals obtained after the time-frequency synchronization, and then determine angles of arrival and time of arrival based on the identified direct path signals.

Step 203: The WLAN device respectively measures the respective positioning data of the plurality of to-be-positioned WLAN devices based on the signals obtained after the uplink signals sent by the plurality of to-be-positioned WLAN devices are decoded.

The positioning data of the to-be-positioned WLAN device is used to position the to-be-positioned WLAN device. The positioning the to-be-positioned WLAN device may include performing angle estimation on the to-be-positioned WLAN device, perform distance measurement on the to-be-positioned WLAN device, or performing distance measurement and angle estimation on the to-be-positioned WLAN device, that is, determining location data of the to-be-positioned WLAN device.

In addition, the operation of determining the location data of the to-be-positioned WLAN device may be performed by the WLAN device, or may be performed by a positioning server. When the operation of determining the location data of the to-be-positioned WLAN device is performed by the positioning server, the positioning data may be intermediate data used to calculate the location data of the to-be-positioned WLAN device, and the WLAN device may send the positioning data to the positioning server, so that the positioning server determines the location data of the to-be-positioned WLAN device based on the positioning data.

When the operation of determining the location data of the to-be-positioned WLAN device is performed by the WLAN device, the positioning data may be the location data of the to-be-positioned WLAN device; or the positioning data may be intermediate data used to determine the location data of the to-be-positioned WLAN device, and the WLAN device may determine the location data of the to-be-positioned WLAN device based on the intermediate data. For example, when the WLAN device has an angle measurement capability, the intermediate data may be an angle of arrival of the to-be-positioned WLAN device relative to the WLAN device and time used for packet transmission between the WLAN device and the to-be-positioned WLAN device, and the WLAN device may determine the location data of the to-be-positioned WLAN device based on the angle of arrival and the time. For example, when the WLAN device has distance measurement and angle measurement capabilities, the intermediate data may be an angle of arrival of the to-be-positioned WLAN device relative to the WLAN device and a distance between the WLAN device and the to-be-positioned WLAN device, and the WLAN device may determine the location data of the to-be-positioned WLAN device based on the angle of arrival and the distance.

The WLAN device usually has a plurality of antenna subarrays disposed at different locations. The WLAN device may separately receive, by using the plurality of antenna subarrays, an uplink signal sent by a same to-be-positioned WLAN device. Because the plurality of antenna subarrays is disposed at different locations, a plurality of measurement reference codes respectively received by the plurality of antenna subarrays have different receiving phases. The receiving phases of the plurality of measurement reference codes received by the antenna subarrays are used to reflect direction relationships between the to-be-positioned WLAN device and the corresponding antenna subarrays. After obtaining the decoded uplink signal, the WLAN device may determine, based on the receiving phases of the measurement reference codes received by the different antenna subarrays, a receiving phase difference between the antenna subarrays that receive the different measurement reference codes. In addition, an angle of arrival (AoA) of the to-be-positioned WLAN device relative to the WLAN device may be determined based on the receiving phase difference and the disposition locations of the plurality of antenna subarrays, that is, angle estimation on the to-be-positioned WLAN device is implemented.

In addition, a distance between the WLAN device and the to-be-positioned WLAN device may be determined based on time used for packet transmission between the WLAN device and the to-be-positioned WLAN device, to implement distance measurement on the to-be-positioned WLAN device. The time used for packet transmission between the WLAN device and the to-be-positioned WLAN device may be time of flight (ToF) in which the to-be-positioned WLAN device sends the uplink signal to the WLAN device; or round trip time (RTT) of the uplink signal in a signal sending process in which the to-be-positioned WLAN device sends the uplink signal to the WLAN device, and then the WLAN device sends the uplink signal to the to-be-positioned WLAN device. Alternatively, when the to-be-positioned WLAN device is positioned by using at least three WLAN devices, the time used for packet transmission between the WLAN device and the to-be-positioned WLAN device may be: an absolute time difference between time at which a packet arrives at every two WLAN devices (for example, a time difference of arrival, TDoA) when the to-be-positioned WLAN device separately sends the packet to the at least three WLAN devices.

Figure 7:
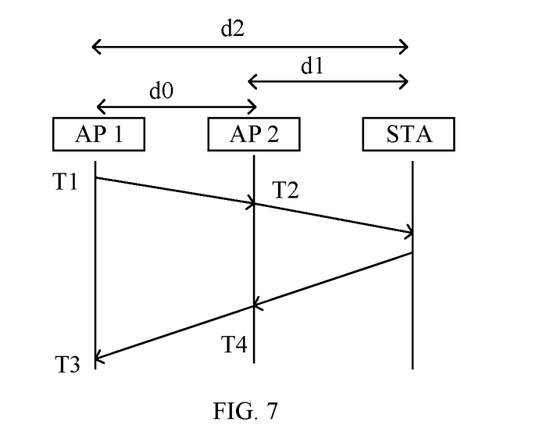
FIG. 7 is a schematic diagram of a positioning principle according to an embodiment of this application.

For example, as shown in FIG. 7, it is assumed that a distance between an AP 1 and an AP 2 is d0, a distance between the AP 1 and a STA is d2, and a distance between the AP 2 and the STA is d1. A trigger frame sent by the AP 1 at a moment T1 is obtained by the AP 2 at a moment T2 through listening. An uplink packet sent by the STA based on the trigger frame is received by the AP 2 at a moment T4, and is received by the AP 1 at a moment T3. The following relationship may be obtained based on the sending moment and the receiving moment (for example, time of arrival) of the trigger frame and the receiving moments of the uplink signal.

Duration from the moment at which the AP 1 sends the trigger frame to the moment at which the AP 1 receives the uplink signal sent by the STA is T31=T3−T1=(d2/c)×2+t0, where t0 is a time difference between a moment at which the STA receives the trigger frame and a moment at which the STA sends the uplink signal based on the trigger frame.

Duration from the moment at which the AP 2 receives the trigger frame to the moment at which the AP 2 receives the uplink signal sent by the STA is T42=T4−T2=(d2/c+d1/c+t0)−d0/c.

Correspondingly, a time difference of flight of the signal may be obtained as follows: T42−T31+d0/c=(d1−d2)/c. In addition, a difference between distances from the STA to the AP 1 and the AP 2 may be determined based on the time difference of flight: S1=(T42−T31+d0/c)×c=d1−d2.

According to a hyperbolic positioning principle, a hyperbola Q1 in which the AP 1 and the AP 2 are focal points of the hyperbola, and the distance difference is a difference between distances from a point on the hyperbola to the focal points may be obtained, that is, it may be learned that the STA is on the hyperbola Q1.

Similarly, an AP 3 may be further used to listen to the trigger frame sent by the AP 1, and the AP 3 may be further used to receive the uplink signal sent by the STA. In addition, based on a moment at which the AP 3 obtains the trigger frame through listening, a moment at which the AP 3 receives the uplink signal sent by the STA, the moment at which the AP 1 sends the trigger frame, and the moment at which the AP 1 receives the uplink signal, a difference S2 between distances from the STA to the AP 1 and the AP 3 may be obtained, and a hyperbola Q2 in which the AP 1 and the AP 3 are focal points of the hyperbola, the distance difference S2 is a difference between distances from a point on the hyperbola to the focal points may be obtained, and it may be determined that the STA is on the hyperbola Q2. In this case, it may be determined that an intersection point of the hyperbola Q1 and the hyperbola Q2 is a location of the STA.

Figure 8:
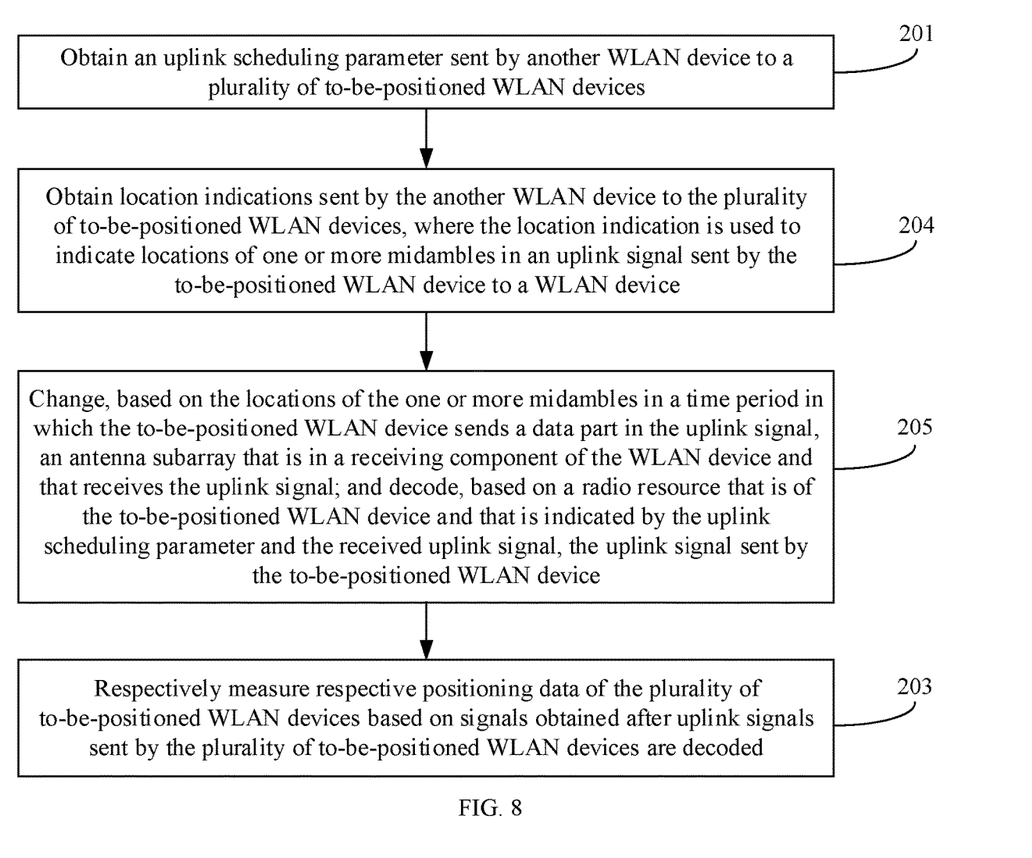
FIG. 8 is a flowchart of another positioning method according to an embodiment of this application.

It should be noted that the uplink signal sent by the to-be-positioned WLAN device may include a plurality of measurement reference codes. The WLAN device may respectively receive the plurality of measurement reference codes by using different antenna subarrays, and measure the positioning data of the to-be-positioned WLAN device based on the plurality of measurement reference codes received by the different antenna subarrays. The plurality of measurement reference codes includes a preamble and one or more midambles of the uplink signal. In order that the WLAN device can respectively receive the plurality of measurement reference codes by using the different antenna subarrays, the WLAN device needs to pre-obtain locations of the plurality of measurement reference codes in the uplink signal, to change, based on the locations of the plurality of measurement reference codes in the uplink signal, an antenna subarray that is in a receiving component of the WLAN device and that receives the uplink signal. Correspondingly, as shown in FIG. 8, before step 202, the positioning method provided in this embodiment of this application may further include the following step.

Step 204: The WLAN device obtains location indications sent by the other WLAN device to the plurality of to-be-positioned WLAN devices, where the location indication is used to indicate locations of the one or more midambles in the uplink signal sent by the to-be-positioned WLAN device to the WLAN device.

For an implementation of step 204, refer to the implementation of step 201. For example, in a first implementable manner of step 204, because the WLAN device may perform uplink scheduling on the to-be-positioned WLAN device by using a trigger frame, and the trigger frame may include an indication of the locations of the one or more midambles carried in the uplink signal, the WLAN device may listen to a trigger frame sent by the other WLAN device to the plurality of to-be-positioned WLAN devices, and extract, from the trigger frame, an indication of the locations of the one or more midambles carried in the uplink signal. For an implementation of trigger frame listening, correspondingly refer to the implementation of the trigger frame listening in step 201. Details are not described herein again.

In addition, the location of the midamble in the uplink signal may be indicated by a length of the uplink signal and an interval between adjacent midambles. Correspondingly, the trigger frame may indicate the length of the uplink signal and the interval between adjacent midambles. For example, according to the 802.11.ax protocol, the trigger frame may carry a doppler field, an uplink frame length (UL length) field, and a midamble periodicity field. The doppler field is used to define whether the uplink signal carries a midamble. The frame length field is used to define the length of the uplink signal, and the length of the uplink signal is a length of valid data in the uplink signal. The midamble periodicity field is used to define the interval between adjacent midambles in the uplink signal. Therefore, the doppler field, the frame length field, and the midamble periodicity field in the trigger frame may be extracted to obtain the indication of the locations of the one or more midambles carried in the uplink signal.

Both the preamble and the midambles are used to perform channel estimation. When the uplink signal includes the preamble and the midambles, in a process of receiving the uplink signal, the to-be-positioned WLAN device may separately perform channel estimation on a radio channel based on the received preamble and midambles. Because a sending interval between different measurement reference codes is less than a sending interval between different uplink signals, channel estimation accuracy can be improved when channel estimation is performed based on the measurement reference codes, so that impact of fast radio channel fading on channel estimation accuracy can be effectively reduced. Correspondingly, when the positioning data of the to-be-positioned WLAN device is measured based on the uplink signal that includes the midambles, accuracy of positioning performed based on the positioning data can be improved.

When the positioning method provided in this embodiment of this application includes step 204, an implementation process of step 202 includes step 205 in FIG. 8 such as the WLAN device changes, based on the locations of the one or more midambles in a time period in which the to-be-positioned WLAN device sends a data part in the uplink signal, the antenna subarray that is in the receiving component of the WLAN device and that receives the uplink signal; and decodes, based on the radio resource that is of the to-be-positioned WLAN device and that is indicated by the uplink scheduling parameter and the received uplink signal, the uplink signal sent by the to-be-positioned WLAN device.

After receiving the location indication of the midambles, the to-be-positioned WLAN device may send the uplink signal to the WLAN device based on the location indication. The uplink signal includes a specified quantity of midambles, and a plurality of OFDM symbols are inserted between every two midambles that are adjacent in a time sequence. Correspondingly, in the time period in which the to-be-positioned WLAN device sends the data part in the uplink signal, the WLAN device may change, based on the locations that are of the one or more midambles and that are indicated by the location indication, the antenna subarray that is in the receiving component of the WLAN device and that receives the uplink signal, to respectively receive the plurality of measurement reference codes in the uplink signal by using at least two antenna subarrays in the receiving component. The data part is between two adjacent measurement reference codes in the plurality of measurement reference codes of the uplink signal. The plurality of measurement reference codes includes the preamble and the one or more midambles of the uplink signal. In addition, the at least two antenna subarrays are at different locations, so that after the at least two antenna subarrays respectively receive the plurality of measurement reference codes, angle estimation can be performed on the to-be-positioned WLAN device based on the plurality of measurement reference codes.

In an implementable manner, the receiving component includes one or more radio frequency circuits and at least two antenna subarrays. Correspondingly, an implementation process of step 205 may include the WLAN device controls electrical connection statuses between the at least two antenna subarrays and the radio frequency circuits in a time division manner based on the locations of the one or more midambles in the time period in which the to-be-positioned WLAN device sends the data part in the uplink signal, so that when any measurement reference code is sent to the WLAN device, one of the at least two antenna subarrays is electrically connected to a radio frequency circuit, so that the at least two antenna subarrays respectively receive the plurality of measurement reference codes.

In a case, a total quantity of antenna subarrays in the WLAN device may be equal to a total quantity of radio frequency circuits, that is, the at least two antenna subarrays in the WLAN device are in a one-to-one correspondence with a plurality of radio frequency circuits. Correspondingly, when controlling the electrical connection statuses between the at least two antenna subarrays and the radio frequency circuits in a time division manner, the WLAN device may respectively control, at different moments, different antenna subarrays to be electrically connected to radio frequency circuits corresponding to the different antenna subarrays.

In another case, a total quantity of antenna subarrays in the WLAN device may be greater than a total quantity of radio frequency circuits. Correspondingly, when controlling the electrical connection statuses between the at least two antenna subarrays and the radio frequency circuits in a time division manner, the WLAN device may control all or some of the at least two antenna subarrays to be electrically connected to a same radio frequency circuit at different moments.

For example, one radio frequency circuit may be configured in the WLAN device. When controlling the electrical connection statuses between the at least two antenna subarrays and the radio frequency circuits in a time division manner, the WLAN device may control the radio frequency circuit to be electrically connected to different antenna subarrays at different moments. In addition, a switch may be further disposed in the WLAN device, one end of the switch is electrically connected to the radio frequency circuit, and the other end of the switch is electrically connected to the antenna subarray, so that the electrical connection status between the radio frequency circuit and the antenna subarray can be controlled through closing or opening of the switching switch.

For another example, it is assumed that one midamble is inserted every M OFDM symbols in the uplink signal, and the WLAN device has seven antenna subarrays. After the WLAN device sends a trigger frame to the to-be-positioned WLAN device, the WLAN device may control the first antenna subarray to be electrically connected to a radio frequency circuit, to receive the preamble in the uplink signal by using the first antenna subarray. After the first antenna subarray receives the preamble, in a time period in which the to-be-positioned WLAN device sends M OFDM symbols behind the preamble, the WLAN device may switch an antenna subarray electrically connected to the radio frequency circuit to the second antenna subarray, to receive the first midamble in the uplink signal by using the second antenna subarray. After the second antenna subarray receives the first midamble, in a time period in which the to-be-positioned WLAN device sends M OFDM symbols behind the first midamble, the WLAN device may switch the antenna subarray electrically connected to the radio frequency circuit to the third antenna subarray, to receive the second midamble in the uplink signal by using the third antenna subarray. According to this rule, the antenna subarray electrically connected to the radio frequency circuit is sequentially adjusted until receiving of all midambles in the uplink signal is completed.

It should be noted that in a process of adjusting the electrical connection status between the antenna subarray and the radio frequency circuit, the WLAN device may compare a total quantity of times of adjusting an operating status of the receiving component with a total quantity of midambles indicated in the trigger frame. When the total quantity of times of adjusting the operating status of the receiving component is equal to the total quantity of midambles indicated in the trigger frame, the WLAN device may determine that receiving of all midambles in the uplink signal is completed, and therefore may no longer adjust the operating status of the receiving component.

The electrical connection statuses between the at least two antenna subarrays and the radio frequency circuits are adjusted based on locations of the measurement reference codes, so that some or all of the at least two antenna subarrays can share a radio frequency circuit. Compared with a related technology, a quantity of radio frequency circuits that need to be configured in the WLAN device can be reduced, so that positioning costs can be effectively reduced.

In addition, the antenna subarray that is in the receiving component and that receives the uplink signal is changed in the time period in which the to-be-positioned WLAN device sends the data part in the uplink signal, so that the WLAN device can obtain the plurality of measurement reference codes by receiving one uplink signal. Compared with a technology of receiving a plurality of uplink signals by using different antenna subarrays, because a sending interval between different measurement reference codes is less than a sending interval between different uplink signals, a probability of channel change between different measurement reference codes is effectively reduced. Therefore, impact of channel change on positioning accuracy can be reduced.

It should be noted that the total quantity of antenna subarrays that the WLAN device has may be adjusted based on an application requirement. In addition, when the WLAN device has a plurality of radio frequency circuits, in the process of adjusting the electrical connection status between the antenna subarray and the radio frequency circuit, the radio frequency circuit electrically connected to the antenna subarray may also be adjusted based on an application requirement. This is not limited in this embodiment of this application. In addition, a type of the antenna subarray in the WLAN device is also limited in this embodiment of this application. For example, the antenna subarray in the WLAN device may be a linear array, a uniform circular array, or a uniform planar array.

It should be further noted that the receiving component may further include a reference antenna. Therefore, to further improve positioning accuracy of the to-be-positioned WLAN device, the plurality of measurement reference codes may be received by using the reference antenna, and signal compensation may be performed on a same measurement reference code received by the antenna subarray by using the measurement reference code received by the reference antenna.

Figure 9:
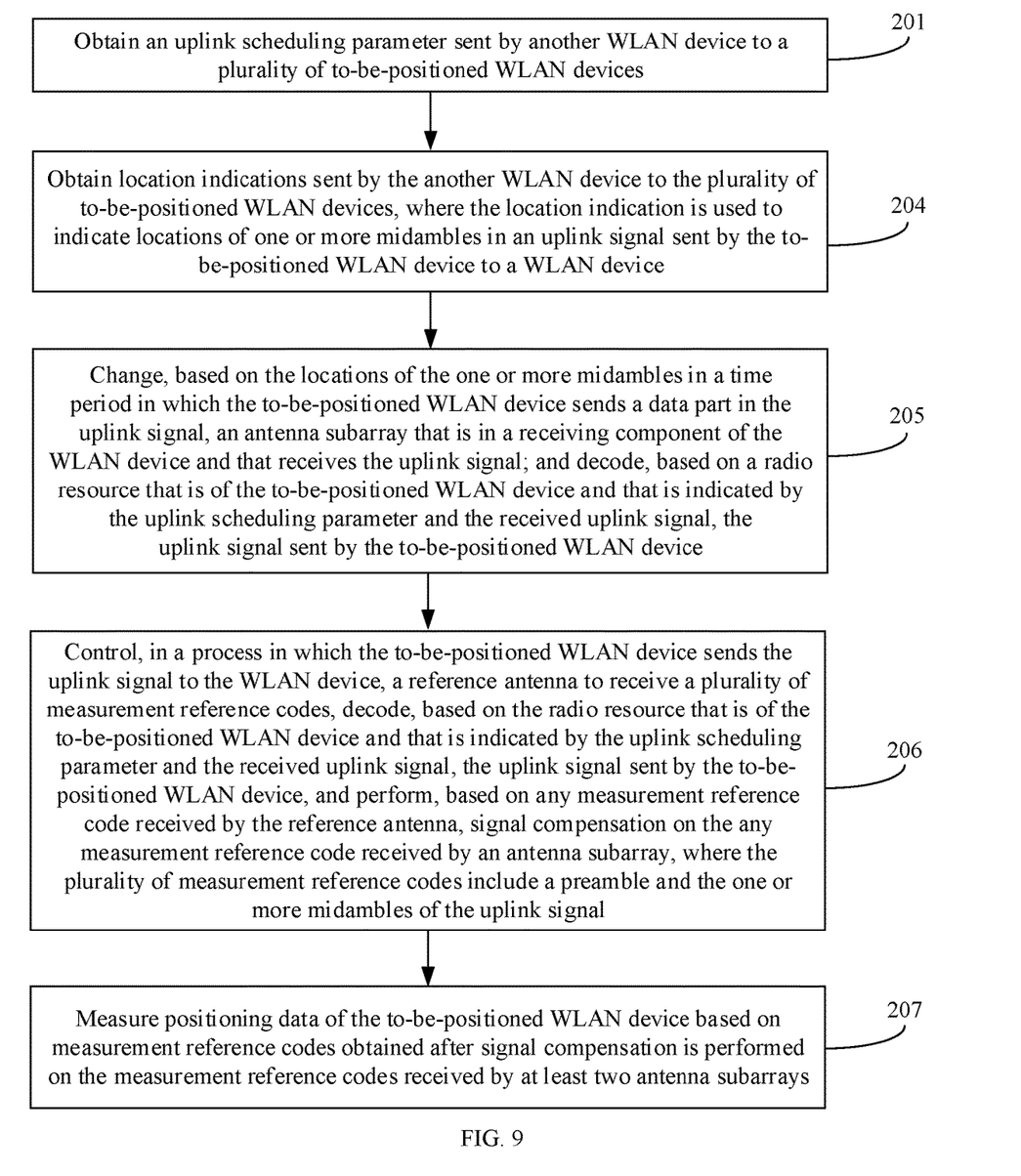
FIG. 9 is a flowchart of still another positioning method according to an embodiment of this application.

Correspondingly, when the positioning method provided in this embodiment of this application further includes step 204, the implementation process of step 202 may further include step 206 in FIG. 9 such as the WLAN device controls, in a process in which the to-be-positioned WLAN device sends the uplink signal to the WLAN device, the reference antenna to receive the plurality of measurement reference codes, decodes, based on the radio resource that is of the to-be-positioned WLAN device and that is indicated by the uplink scheduling parameter and the received uplink signal, the uplink signal sent by the to-be-positioned WLAN device, and performs, based on any measurement reference code received by the reference antenna, signal compensation on the any measurement reference code received by an antenna subarray, where the plurality of measurement reference codes include the preamble and the one or more midambles of the uplink signal.

A location of the reference antenna is fixed, and it may be considered that a channel has same impact on different measurement reference codes received by the reference antenna. In addition, a phase of the measurement reference code received by the receiving component is further affected by performance of a receiver in the receiving component in addition to the channel. Therefore, if the performance of the receiver in the receiving component is stable, different measurement reference codes received by the reference antenna should have a same phase. Correspondingly, when different measurement reference codes received by the reference antenna have different phases, it may be determined that the performance of the receiver is unstable.

In addition, because the at least two antenna subarrays are disposed at different locations, the channel has different impact on phases of different measurement reference codes received by the at least two antenna subarrays. That is, when the performance of the receiver is stable, measurement reference codes received by different antenna subarrays have different phases, and a phase difference between different measurement reference codes is caused by a channel change. However, if the performance of the receiver is unstable, for example, when crystal oscillator drift occurs on the receiver, the phase of the measurement reference code may be further affected by the performance of the receiver.

Therefore, in the process in which the to-be-positioned WLAN device sends the uplink signal to the WLAN device, the WLAN device may control the reference antenna to be always in a receiving state, to receive the plurality of measurement reference codes in the uplink signal by using the reference antenna. When there is a phase difference between two measurement reference codes that are collected by the reference antenna and that are adjacent in a time sequence, it may be determined that the performance of the receiver is unstable. In this case, signal compensation may be performed, by using the phase difference, on a measurement reference code that is later in a time sequence in the two measurement reference codes collected by antenna subarrays, to compensate for impact of instability of the receiver on phases of the measurement reference codes received by the antenna subarrays.

Optionally, a signal compensation implementation may include determining a weighted sum of a phase difference between two measurement reference codes that are collected by the reference antenna and that are adjacent in a time sequence and a phase of a measurement reference code that is later in a time sequence in the two measurement reference codes collected by antenna subarrays, and determining the weighted sum as a measurement reference code obtained after signal compensation is performed on the measurement reference code that is later in a time sequence. In addition, a weight value of the phase difference and a weight value of the measurement reference code may be determined based on an application requirement. For example, both the weight value of the phase difference and the weight value of the measurement reference code may be 1.

Signal compensation is performed on the measurement reference code, so that impact of instability of the receiver on phases of the measurement reference codes received by the antenna subarrays can be compensated for, so that the measurement reference code obtained after the signal compensation can really reflect a channel change. When channel estimation is performed based on the measurement reference code obtained after the signal compensation, a channel estimation result is closer to a real channel status. In this case, when the to-be-positioned WLAN device is positioned based on the channel estimation result, positioning accuracy can be further improved.

It should be noted that step 206 is an optional step. In a positioning process, whether to perform step 206 may be determined based on an application requirement.

When the positioning method provided in this embodiment of this application further includes step 204, and the implementation process of step 202 includes step 205 and step 206, an implementation process of step 203 includes step 207 in FIG. 9 such as the WLAN device measures the positioning data of the to-be-positioned WLAN device based on measurement reference codes obtained after signal compensation is performed on the measurement reference codes received by the at least two antenna subarrays. For an implementation process of measuring the positioning data of the to-be-positioned WLAN device, correspondingly refer to the foregoing implementation process of step 203. Details are not described herein again.

In conclusion, in the positioning method provided in this embodiment of this application, the WLAN device obtains the uplink scheduling parameter sent by the other WLAN device to the plurality of to-be-positioned WLAN devices, so that the WLAN device does not need to send, to the to-be-positioned WLAN devices, an uplink scheduling signal that carries the uplink scheduling parameter. In this way, the WLAN device can measure the positioning data of the to-be-positioned WLAN devices based on the uplink scheduling parameter after obtaining the uplink scheduling parameter, and therefore does not need to measure the positioning data of the to-be-positioned WLAN devices only after the WLAN device sends the uplink scheduling signal to the to-be-positioned WLAN devices, thereby effectively improving positioning timeliness of the to-be-positioned WLAN devices.

In addition, because a total quantity of uplink scheduling signals that need to be sent when uplink scheduling is performed on the to-be-positioned WLAN devices is reduced, air interface overheads are effectively reduced.

It should be noted that a sequence of the steps of the positioning method in this embodiment of this application may be appropriately adjusted, and the steps may also be correspondingly added or deleted based on a situation. All variant methods readily figured out by a person skilled in the art within the technical scope disclosed in this application shall fall within the protection scope of this application. Details are not described again.

The following describes apparatus embodiments of this application that may be configured to perform the method embodiments of this application. For details not disclosed in the apparatus embodiments of this application, refer to the method embodiments of this application.

Figure 10:
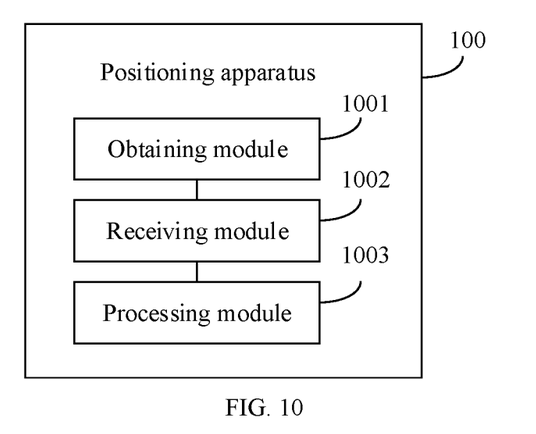
FIG. 10 is a block diagram of a structure of a positioning apparatus according to an embodiment of this application.

An embodiment of this application provides a positioning apparatus. As shown in FIG. 10, a positioning apparatus 100 may include an obtaining module 1001, configured to obtain an uplink scheduling parameter sent by another WLAN device to a plurality of to-be-positioned WLAN devices, where the uplink scheduling parameter is used to indicate radio resources allocated to the plurality of to-be-positioned WLAN devices; a receiving module 1002, configured to receive uplink signals; and a processing module 1003, configured to measure respective positioning data of the plurality of to-be-positioned WLAN devices based on the radio resources of the plurality of to-be-positioned WLAN devices and the received uplink signals.

Optionally, the obtaining module 1001 is configured to listen to a trigger frame sent by the other WLAN device; and extract the uplink scheduling parameter from the trigger frame.

Optionally, the positioning apparatus 100 includes a listening receiver, and an operating channel of the listening receiver is the same as an operating channel of the other WLAN device.

Optionally, both the positioning apparatus 100 and the other WLAN device include baseband circuits, and a baseband circuit of the positioning apparatus 100 is connected to a baseband circuit of the other WLAN device in a wired manner; and the obtaining module 1001 is configured to receive, by using the baseband circuit of the positioning apparatus 100, the uplink scheduling parameter sent by the baseband circuit of the other WLAN device.

In conclusion, in the positioning apparatus provided in this embodiment of this application, the uplink scheduling parameter sent by the other WLAN device to the plurality of to-be-positioned WLAN devices is obtained by using the obtaining module, so that the positioning apparatus does not need to send, to the to-be-positioned WLAN devices, an uplink scheduling signal that carries the uplink scheduling parameter. In this way, the processing module can measure the positioning data of the to-be-positioned WLAN devices based on the uplink scheduling parameter after the positioning apparatus obtains the uplink scheduling parameter, and therefore does not need to measure the positioning data of the to-be-positioned WLAN devices only after the positioning apparatus sends the uplink scheduling signal to the to-be-positioned WLAN devices, thereby effectively improving positioning timeliness of the to-be-positioned WLAN devices.

In addition, because a total quantity of uplink scheduling signals that need to be sent when uplink scheduling is performed on the to-be-positioned WLAN devices is reduced, air interface overheads are effectively reduced.

It may be clearly understood by a person skilled in the art that, for the purpose of convenient and brief description, for a detailed working process of the foregoing apparatus and module, refer to a corresponding process in the foregoing method embodiment. Details are not described herein again.

Figure 11:
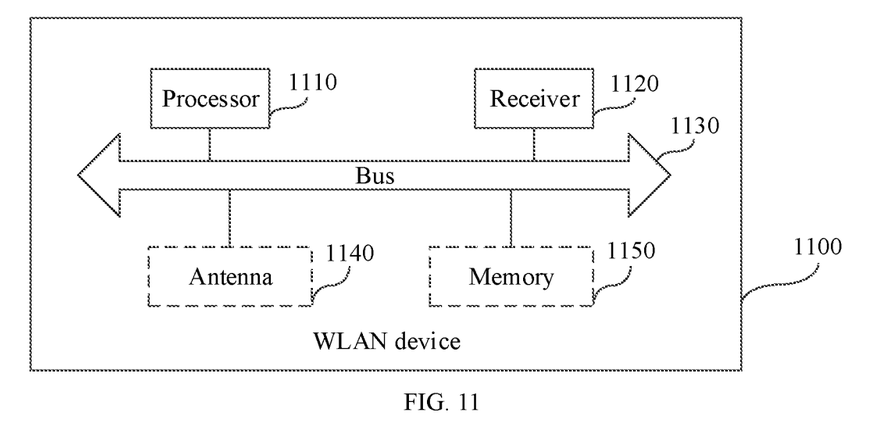
FIG. 11 is a schematic diagram of a structure of a WLAN device according to an embodiment of this application.

An embodiment of this application further provides a WLAN device. As shown in FIG. 11, a WLAN device 1100 includes a processor 1110 and a receiver 1120. The processor 1110 is connected to the receiver 1120 by using a bus 1130. Optionally, the WLAN device may be a WAP or a part of the WAP. The WAP may be a station device, a network device, or the like with a WLAN chip. The bus 1130 may be classified into an address bus, a data bus, a control bus, and the like. For ease of representation, only one thick line is used to represent the bus in FIG. 11, but this does not mean that there is only one bus or only one type of bus.

The processor 1110 is configured to obtain an uplink scheduling parameter sent by another WLAN device to a plurality of to-be-positioned WLAN devices, where the uplink scheduling parameter is used to indicate radio resources allocated to the plurality of to-be-positioned WLAN devices. The receiver 1120 is configured to receive uplink signals, and transmit the received uplink signals to the processor 1110. The processor 1110 is configured to measure respective positioning data of the plurality of to-be-positioned WLAN devices based on the radio resources of the plurality of to-be-positioned WLAN devices and the received uplink signals.

The processor 1110 may include at least one of a baseband circuit or a signal processor. When the processor 1110 includes the baseband circuit, the function of measuring the respective positioning data of the plurality of to-be-positioned WLAN devices is implemented by the baseband circuit. When the processor 1110 includes the signal processor, the function of measuring the respective positioning data of the plurality of to-be-positioned WLAN devices is implemented by the signal processor. When the processor 1110 includes the baseband circuit and the signal processor, the function of measuring the respective positioning data of the plurality of to-be-positioned WLAN devices is implemented by any one of the baseband circuit and the signal processor, or is cooperatively implemented by the baseband circuit and the signal processor.

The signal processor may be a signal processor that implements a function by using software, such as a digital signal processor (DSP). Alternatively, the signal processor may be a hardware chip. For example, the hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

Optionally, the receiver 1120 is a component having at least a signal receiving function. For example, the receiver 1120 may be a receiver 1120 dedicated to receiving a signal. Alternatively, the receiver 1120 may also have a signal sending function. In this case, the receiver 1120 is also referred to as a transceiver.

The receiver 1120 includes a radio frequency circuit. Correspondingly, as shown in FIG. 11, the WLAN device further includes an antenna 1140. The receiver 1120 implements the signal receiving function by using the antenna 1140. In addition, when the receiver 1120 further has the signal sending function, the receiver 1120 implements the signal sending function by using the antenna 1140.

As shown in FIG. 11, the WLAN device may further include a memory 1150. The memory 1150 is configured to store the uplink scheduling parameter, the uplink signals, and the like. In addition, when the signal processor implements a function in a software manner, the memory 1150 is further configured to store program instructions. The signal processor may implement, by invoking the program instructions stored in the memory 1150, functions that need to be implemented by the signal processor. For example, the signal processor may measure the respective positioning data of the plurality of to-be-positioned WLAN devices based on the radio resources of the plurality of to-be-positioned WLAN devices and the received uplink signals by invoking a program instruction stored in the memory 1150.

Optionally, the memory 1150 may include a volatile memory, for example, a random-access memory (RAM); or the memory 1150 may include a nonvolatile memory, for example, a flash memory, a hard disk drive (HDD), or a solid-state drive (SSD); or the memory 1150 may include a combination of the foregoing types of memories.

In an implementable manner of obtaining the uplink scheduling parameter, the receiver 1120 is further configured to listen to a trigger frame sent by the other WLAN device, extract the uplink scheduling parameter from the trigger frame, and transmit the uplink scheduling parameter to the processor 1110. Correspondingly, when being configured to obtain the uplink scheduling parameter sent by the other WLAN device to the plurality of to-be-positioned WLAN devices, the processor 1110 is configured to receive the uplink scheduling parameter transmitted by the receiver 1120.

In this case, the receiver 1120 may include a listening receiver, and an operating channel of the listening receiver is the same as an operating channel of the other WLAN device.

In another implementable manner of obtaining the uplink scheduling parameter, both the WLAN device and the other WLAN device include baseband circuits, and a baseband circuit of the WLAN device is connected to a baseband circuit of the other WLAN device in a wired manner. The baseband circuit of the WLAN device is configured to receive the uplink scheduling parameter transmitted by the baseband circuit of the other WLAN device, and transmit the uplink scheduling parameter to the processor 1110. Correspondingly, when being configured to obtain the uplink scheduling parameter sent by the other WLAN device to the plurality of to-be-positioned WLAN devices, the processor 1110 is configured to receive the uplink scheduling parameter transmitted by the baseband circuit of the WLAN device.

It should be noted that when the WLAN device further includes a transmitter, both the receiver 1120 and the transmitter may have baseband circuits. In this case, a baseband circuit configured to receive the uplink scheduling parameter sent by the other WLAN device may be any one of a baseband circuit of the receiver 1120 or a baseband circuit of the transmitter. Alternatively, when the transmitter and the receiver 1120 share a baseband circuit, a baseband circuit configured to receive the uplink scheduling parameter sent by the other WLAN device is the shared baseband circuit. When the receiver 1120 is essentially a transceiver, a baseband circuit configured to receive the uplink scheduling parameter sent by the other WLAN device is a baseband circuit of the transceiver.

Optionally, the antenna 1140 includes at least two antenna subarrays, and the at least two antenna subarrays are at different locations. In addition, the uplink signal sent by the to-be-positioned WLAN device may include a plurality of measurement reference codes. The WLAN device may respectively receive the plurality of measurement reference codes by using different antenna subarrays, and measure the positioning data of the to-be-positioned WLAN device based on the plurality of measurement reference codes received by the different antenna subarrays. The plurality of measurement reference codes includes a preamble and one or more midambles of the uplink signal. In order that the WLAN device can respectively receive the plurality of measurement reference codes by using the different antenna subarrays, the WLAN device needs to pre-obtain locations of the plurality of measurement reference codes in the uplink signal, to change, based on the locations of the plurality of measurement reference codes in the uplink signal, an antenna subarray that is in the antenna and that is used by the receiver 1120 to receive the uplink signal.

In this case, the receiver 1120 is further configured to obtain location indications sent by the other WLAN device to the plurality of to-be-positioned WLAN devices, where the location indication is used to indicate locations of the one or more midambles in the uplink signal sent by the to-be-positioned WLAN device to the WLAN device. Correspondingly, when the receiver 1120 is configured to receive the uplink signal, the receiver 1120 is configured to change, based on the locations of the one or more midambles in a time period in which the to-be-positioned WLAN device sends a data part in the uplink signal, the antenna subarray that is in the antenna 1140 and that is used by the receiver 1120 to receive the uplink signal. The data part is between two adjacent measurement reference codes in the plurality of measurement reference codes of the uplink signal. The plurality of measurement reference codes includes the preamble of the uplink signal and the one or more midambles indicated by a trigger frame. In addition, after receiving the measurement reference codes by using the antenna subarrays, the receiver 1120 is further configured to transmit, to the processor 1110, different measurement reference codes in the uplink signal that are received by different antenna subarrays before and after the change. Correspondingly, when being configured to measure the respective positioning data of the plurality of to-be-positioned WLAN devices based on the radio resources of the plurality of to-be-positioned WLAN devices and the received uplink signals, the processor 1110 is configured to measure the positioning data of the to-be-positioned WLAN device based on the different measurement reference codes in the uplink signal that are received by the different antenna subarrays before and after the change and the radio resources.

The trigger frame may indicate a length of the uplink signal and an interval between adjacent midambles, to indicate the locations of one or more midambles.

In an implementable manner, the receiver 1120 may further include a switching switch. In this case, when the receiver 1120 is configured to change, based on the locations of the one or more midambles in the time period in which the to-be-positioned WLAN device sends the data part in the uplink signal, the antenna subarray that is in the antenna 1140 and that is used by the receiver 1120 to receive the uplink signal, an implementation thereof may include controlling, by controlling the switching switch, electrical connection statuses between the at least two antenna subarrays and the radio frequency circuit in a time division manner based on the locations of the one or more midambles in the time period in which the to-be-positioned WLAN device sends the data part in the uplink signal, so that when any measurement reference code is sent to the WLAN device, one of the at least two antenna subarrays is electrically connected to the radio frequency circuit.

Optionally, the antenna 1140 further includes a reference antenna. The reference antenna is configured to, in a process in which the to-be-positioned WLAN device sends the uplink signal to the WLAN device, receive the plurality of measurement reference codes, and transmit the plurality of measurement reference codes received by the reference antenna to the processor 1110. In this case, the processor 1110 is further configured to perform, based on any measurement reference code received by the reference antenna, signal compensation on the any measurement reference code received by an antenna subarray in the at least two antenna subarrays. Correspondingly, the processor 1110 is configured to measure the positioning data of the to-be-positioned WLAN device based on measurement reference codes obtained after signal compensation is performed on the measurement reference codes received by the at least two antenna subarrays.

It may be clearly understood by a person skilled in the art that, for the purpose of convenient and brief description, for a detailed working process of the foregoing component such as the receiver, the processor, or the antenna, refer to a corresponding process in the foregoing method embodiment. Details are not described herein again.

An embodiment of this application further provides a computer-readable storage medium. When instructions in the computer-readable storage medium are executed by a computer, the computer is configured to perform the positioning method provided in this application. The computer-readable storage medium includes but is not limited to a volatile memory, such as a RAM, or a nonvolatile memory, such as a flash memory, an HDD, or an SSD.

This application further provides a computer program product. The computer program product includes computer instructions. When the computer program product is executed by a computing device, the computing device performs the positioning method provided in the embodiment of this application.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the principle of this application should fall within the protection scope of this application.

What is claimed is:

1. A positioning method, comprising:
   obtaining, by a wireless local area network (WLAN) device, an uplink scheduling parameter from another WLAN device that intends the uplink scheduling parameter for a plurality of to-be-positioned WLAN devices, wherein the WLAN device and the other WLAN device are not to-be-positioned WLAN devices, and wherein the uplink scheduling parameter indicates radio resources allocated to the plurality of to-be-positioned WLAN devices;
   receiving, by the WLAN device, uplink signals from the to-be-positioned WLAN devices based on the uplink scheduling parameter; and
   measuring, by the WLAN device, respective positioning data of the plurality of to-be-positioned WLAN devices based on the radio resources allocated to the plurality of to-be-positioned WLAN devices and based on the uplink signals.

2. The positioning method of claim 1, wherein the obtaining comprises:
   listening, by the WLAN device, to a trigger frame from the other WLAN device; and
   extracting, by the WLAN device, the uplink scheduling parameter from the trigger frame.

3. The positioning method of claim 2, wherein an operating channel of a listening receiver of the WLAN device is the operating channel of the other WLAN device.

4. The positioning method of claim 2, wherein extracting the uplink scheduling parameter from the trigger frame comprises extracting content from a radio frequency resource unit allocation field to obtain the radio resources allocated to the plurality of to-be-positioned WLAN devices.

5. The positioning method of claim 2, wherein extracting the uplink scheduling parameter from the trigger frame comprises extracting content in a spatial stream allocation field to obtain spatial streams allocated to the plurality of to-be-positioned WLAN devices.

6. The positioning method of claim 1, wherein a first baseband circuit of the WLAN device is connected to a second baseband circuit of the other WLAN device in a wired manner.

7. The positioning method of claim 6, wherein obtaining the uplink scheduling parameter from another WLAN device further comprises receiving, by the first baseband circuit of the WLAN device, the uplink scheduling parameter from the second baseband circuit.

8. A positioning apparatus in a wireless local area network (WLAN) device, wherein the positioning apparatus comprises:
   a processor configured to:
      obtain an uplink scheduling parameter from another WLAN device that intends the uplink scheduling parameter for a plurality of to-be-positioned WLAN devices, wherein the WLAN device and the other WLAN device are not to-be-positioned WLAN devices, and wherein the uplink scheduling parameter indicates radio resources allocated to the plurality of to-be-positioned WLAN devices; and
      measure respective positioning data of the plurality of to-be-positioned WLAN devices based on the radio resources of the plurality of to-be-positioned WLAN devices and uplink signals; and
   a receiver coupled to the processor and configured to receive the uplink signals from the to-be-positioned WLAN devices based on the uplink scheduling parameter.

9. The positioning apparatus of claim 8, wherein the processor is further configured to:
   listen to a trigger frame from the other WLAN device; and
   extract the uplink scheduling parameter from the trigger frame.

10. The positioning apparatus of claim 9, wherein the positioning apparatus comprises a listening receiver, wherein an operating channel of the listening receiver is the operating channel of the other WLAN device.

11. The positioning apparatus of claim 9, wherein the processor is configured to extract content from a radio frequency resource unit allocation field to obtain the radio resources allocated to the plurality of to-be-positioned WLAN devices.

12. The positioning apparatus of claim 9, wherein the processor is configured to extract content in a spatial stream allocation field to obtain spatial streams allocated to the plurality of to-be-positioned WLAN devices.

13. The positioning apparatus of claim 8, wherein the positioning apparatus further comprises a first baseband circuit that is coupled to a second baseband circuit of the other WLAN device in a wired manner.

14. The positioning apparatus of claim 13, wherein the first baseband circuit is configured to receive the uplink scheduling parameter from the second baseband circuit.

15. A wireless local area network (WLAN) device, comprising:
   a processor configured to:
      obtain an uplink scheduling parameter from another WLAN device that intends the uplink scheduling parameter for a plurality of to-be-positioned WLAN devices, wherein the WLAN device and the other WLAN device are not to-be-positioned WLAN devices, and wherein the uplink scheduling parameter indicates radio resources allocated to the plurality of to-be-positioned WLAN devices; and
      measure respective positioning data of the plurality of to-be-positioned WLAN devices based on the radio resources of the plurality of to-be-positioned WLAN devices and uplink signals; and
   a receiver coupled to the processor and configured to:
      receive the uplink signals from the to-be-positioned WLAN devices based on the uplink scheduling parameter; and
      transmit the uplink signals to the processor.

16. The WLAN device of claim 15, wherein the receiver is further configured to:
  listen to a trigger frame from the other WLAN device;
  extract the uplink scheduling parameter from the trigger frame; and
  transmit the uplink scheduling parameter, and
  wherein the processor is further configured to receive the uplink scheduling parameter from the receiver when the processor obtains the uplink scheduling parameter from the other WLAN device.

17. The WLAN device of claim 16, wherein extracting the uplink scheduling parameter comprises extracting content from a radio frequency resource unit allocation field to obtain the radio resources allocated to the plurality of to-be-positioned WLAN devices.

18. The WLAN device of claim 16, wherein extracting the uplink scheduling parameter comprises extracting content in a spatial stream allocation field to obtain spatial streams allocated to the plurality of to-be-positioned WLAN devices.

19. The WLAN device of claim 15, wherein the receiver comprises a listening receiver, and wherein an operating channel of the listening receiver is the operating channel of the other WLAN device.

20. The WLAN device of claim 15, wherein the WLAN device comprises a baseband circuit that is connected to a second baseband circuit of the other WLAN device in a wired manner, and wherein the baseband circuit is configured to:
  receive the uplink scheduling parameter from the second baseband circuit; and
  transmit the uplink scheduling parameter to the processor, and wherein the processor is further configured to receive the uplink scheduling parameter from the baseband circuit when the processor obtains the uplink scheduling parameter from the other WLAN device.

* * * * *